March 20, 1962 C. M. BLISS 3,025,714
TRANSMISSION CONTROL
Filed Sept. 12, 1960

INVENTOR.
Carl M. Bliss
BY
A. M. Heiter
ATTORNEY

United States Patent Office 3,025,714
Patented Mar. 20, 1962

3,025,714
TRANSMISSION CONTROL
Carl M. Bliss, Oak Park, Mich., assignor to General Motors Corporation, Detroit, Mich., a corporation of Delaware
Filed Sept. 12, 1960, Ser. No. 55,468
13 Claims. (Cl. 74—484)

This invention relates to a control linkage and more particularly to improved transmission control linkage connecting a rotatably and reciprocally actuated control member to a pair of transmission control levers.

In transmission linkages mounted on the steering column of a vehicle, the hand control lever located beneath the steering wheel is connected to rotate and reciprocate a control tube mounted coaxially of the steering column. At the lower end of the steering column, a pair of levers are rotatably mounted about the control tube and a clutch mechanism selectively connects the control tube to either lever so that the lever can be rotated with the control tube. In arrangements of this type, lateral forces on the levers often cause tilting and binding of the bearings supporting the levers. In accordance with this invention, it is proposed to mount the levers on the external cylindrical surface of the steering column in order to provide a large diameter bearing surface of more than normal width to provide a firm and rigid bearing support resistant to lateral forces. The clutch mechanism connecting the control member to the levers extends through a small aperture in the steering column. This construction completely seals the steering column to prevent the entrance of dirt which would interfere with the operation of the transmission control bearings and clutch and the steering shaft bearings.

An object of the invention is to provide in a control linkage having a control tube mounted within a support tube, a pair of control levers rotatably mounted on the tube, a pair of control levers rotatably mounted on the external surface of the support tube and a clutching mechanism extending through the support tube to selectively clutch the control tube to each lever.

Another object of the invention is to provide in a transmission control linkage having a control tube rotatably and reciprocally supported within a support tube, a pair of levers having wide cylindrical bearing surfaces rotatably supported on bearing surfaces external of the control tube steering column or support tube and clutching means extending through the steering column or support tube to selectively connect the control member to the levers.

Another object of the invention is to provide in a control linkage having a control member mounted within a support column, having an aperture, a pair of support levers rotatably mounted externally on the support column and completely sealing the aperture and a clutch mechanism connecting the control member selectively to the levers.

These and other objects of the invention will be more apparent from the following description and drawing of the preferred embodiment of the invention.

Figure 1:
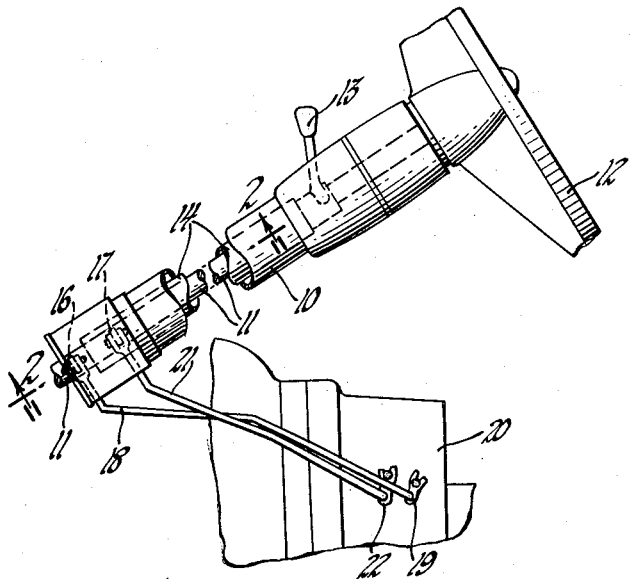
FIGURE 1 illustrates a steering column mounted transmission control assembly.

This invention is illustrated in a transmission control assembly mounted on a steering column 10, which supports the steering shaft 11 and the steering wheel 12. The steering column is preferably a round tube providing an external cylindrical surface. The transmission control lever 13 may be connected in any suitable manner, for example, as shown in the Primeau Patent 2,924,988, issued February 16, 1960, to control the control tube for rotary and reciprocating movement. The hand lever 13 is rocked toward and away from the steering wheel 12 to reciprocate the control tube 14 coaxially of the steering column for selecting movement and rotated about the axis of the steering column rotating control tube about the steering column axis for shifting movement. The lower end of the control tube 14 is on reciprocal movement in an axial direction selectively clutched to the lower lever 16 or the upper lever 17. The lower lever is connected by a rod 18 to the first-reverse shift arm 19 of a transmission 20. The upper lever 17 is similarly connected by a rod 21 to the second-third shift arm 22.

Figure 2:
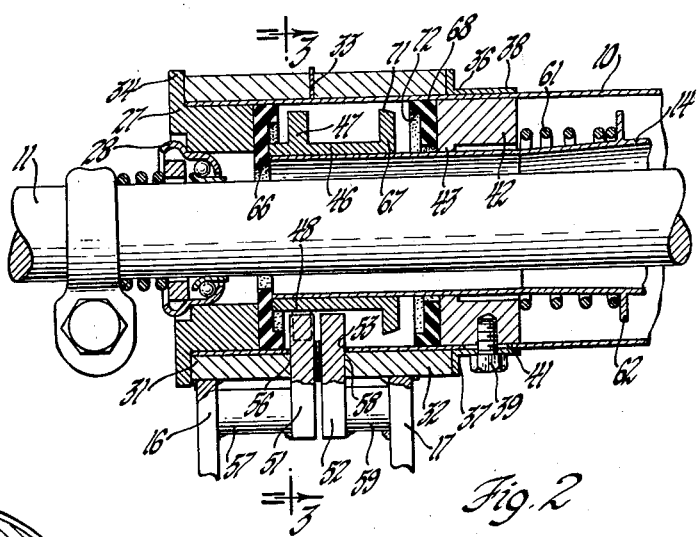
FIGURE 2 is a section along the line 2—2 of FIGURE 1 showing the lower end of the transmission control and clutching assembly.

The steering column 10 is supported in a conventional manner on the vehicle and at the lower end, as best shown in FIGURE 2, has a bearing support member 27 to support the bearing 28 for the steering shaft 11.

The lever 16 is secured by welding or formed integrally with a cylindrical bearing member 31 rotatably supported on the external surface of the steering column 10. The lever 17 is similarly connected to a cylindrical bearing member 32 which is rotatably supported on the external surface of the control steering column 10. A flat thrust washer 33 is located between the cylindrical bearing members 31 and 32. At the lower end of the steering column 10 the bearing support 27 also has a thrust bearing flange 34 extending beyond the outer diameter of the steering column 10 to provide a thrust bearing for the lower edge of the cylindrcal member 31. The thrust bearing member 36 has a thrust bearing flange 37 engaging the upper edge of the cylindrical member 32 and a securing flange 38 secured by screws 39 passing through slots 41 in the steering column and threaded into a bearing ring 42. The slots 41 for each screw may be axial or sloped. The thrust member 36 and the bearing ring 42 may be axially adjusted along the steering column 10 by moving screws 39 axially in the slots to provide the proper bearing clearances between the cylindrical bearing members 31 and 32 and their associated thrust bearings and washers.

Figure 3:
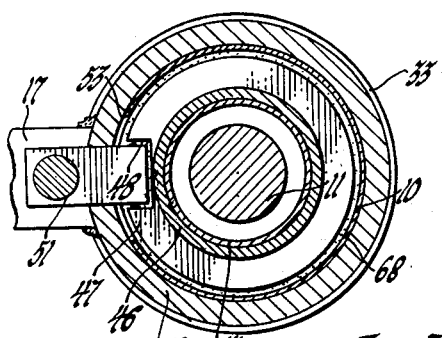
FIGURE 3 is a section of FIGURE 2 on the line 3—3.

The bearing ring 42 has an inner cylindrical bearing surface 43 supporting the control tube 14 for rotary and axial movement. The control tube 14 has a clutch member 46 located between the bearing support 27 and bearing ring 42. The clutch member 46 has an annular ring 47 having a slot 48, as best shown in FIGURE 3, which selectively cooperates with the clutch tooth 51 on the lever 16 and the clutch tooth 52 on the lever 17. The clutch teeth 51 and 52 extend through a partial circumferential slot 53 in the steering column 10. The clutch tooth 51 fits in a recess 56 in the cylindrical member 31 and is anchored in position by a strut 57 secured by welding or screws to the lever arm 16 and the clutch tube 51. The screws to the lever arm 16 and the clutch tube 51. The clutch tooth 52 similarly fits in a recess 58 in the cylindrical member 32 and is secured in position by a strut 59 welded, or otherwise secured, to both the lever 17 and the clutch 52.

The control tube 14 is normally biased to the upper position by a spring 61 which abuts on the bearing ring 42 fixed to the steering column 10, and an abutment 62 fixed to the control tube. The control tube 14 in the lower position shown and the clutch member 46 contact a bumper ring 66 made of rubber-like material. When the control tube 14 is moved to the upper position manually or by the biasing force of spring 61, the stop member or flange 67 of clutch member 46 contacts the upper bumper 68 made of rubber-like material which limits upward movement of the control tube. It will be noted that the outer edge of the bumper flange 67 has a tapered external surface 71 cooperating with an internal cylindrical surface 72 on the bumper 68 to provide a gradually increasing force resisting upward movement from initial contact to the final stopping of the upward movement of the control tube 14.

When the control tube 14 is moved from the normal upward position to the lower position shown, the clutch ring 47 aligns with the clutch tooth 51 connected to lever 16. Then rotation of the control tube 14 will rotate the lever 16 which is supported for rotation by the cylindrical member 31 bearing on the external surface of the steering column 10. When the control lever is manually or automatically moved by the biasing spring to the upper position, the clutch ring 47 moves to a point in alignment with the clutch tooth 52 to position slot 48 in alignment with the clutch tooth 52. Then on rotation of the control tube 14 the clutch tooth 52 and lever 17 rotate with the control tube 14. The lever 17 is similarly supported for rotation by the bearing ring 32 which rotates on the external surface of the steering column 10.

The above described preferred embodiment is illustrative of the invention which may be modified within the scope of the appended claims.

I claim:

1. In a control linkage, a tubular support column having an aperture therein, a control member mounted within said support column for rotary and reciprocal movement about the longitudinal axis of said control member, means to rotate and reciprocate said control member, a pair of controlled members, bearing means mounting said controlled members for rotary movement and axially locating said controlled members on said support column over said aperture to completely close and seal said aperture, clutch means cooperating through said aperture to selectively clutch said control member to said controlled members.

2. In a control linkage, a tubular support column having an aperture therein, a control member mounted within said support column for rotary and reciprocal movement about the longitudinal axis of said control member, means to rotate and reciprocate said control member, a pair of controlled members, bearing means mounting said controlled members externally on said support column for rotary movement and axially locating said bearing rings on said support column over said aperture and to completely close and seal said aperture, clutch means having means within each of said controlled members and means connected to said control member cooperating through said aperture to selectively clutch said control member to said controlled members.

3. In a control linkage, a tubular support column having an aperture therein, a control member mounted within said support column for rotary and reciprocal movement about the longitudinal axis of said control member, means to rotate and reciprocate said control member, a pair of controlled members each having a bearing ring surrounding said support column over said aperture, bearing means mounting said bearing rings for rotary movement and axially locating said bearing rings on said support column over said aperture and completely closing and sealing said aperture, clutch means having means accessible from the internal side of each of said bearing rings and means connected to said control member cooperating through said aperture to selectively clutch said control member to said bearing rings.

4. In a control linkage, a tubular support column having a cylindrical portion with an aperture therein, a control member mounted within said support column for rotary and reciprocal movement about the longitudinal axis of said control member, means to rotate and reciprocate said control member, a pair of bearing rings mounted for rotary movement on said cylindrical portion over said aperture, bearing means axially locating said bearing rings on said support column over said aperture and completely closed and sealed to each other and to said support column on each side of said aperture, clutch means having means on each of said bearing rings and accessible from the inside said bearing rings and means on said control member cooperating through said aperture to selectively clutch said control member to said bearing rings.

5. In a control linkage, a tubular support column having an aperture therein, a control member mounted within said support column for rotary and reciprocal movement about the longitudinal axis of said control member, means to rotate and reciprocate said control member, a pair of bearing rings, bearing means mounting said bearing rings for rotary movement and axially locating said bearing rings on said support column over said aperture to completely close said aperture, a controlled member connected to each of said bearing rings, clutch means having parts on the internal side of each of said bearing rings and parts connected to said control member cooperating through said aperture to selectively clutch said control member to said bearing rings.

6. In a control linkage, a tubular support column having an aperture therein, a control member mounted within said support column for rotary and reciprocal movement about the longitudinal axis of said control member, means to rotate and reciprocate said control member, a pair of bearing rings, bearing means mounting said bearing rings for rotary movement and axially locating said bearings rings on said support column over said aperture to completely close said aperture, a controlled member connected externally to each of said bearing rings, clutch means having parts extending internally of each of said bearing rings and parts connected to said control member cooperating through said aperture to selectively clutch said control member to said bearing rings.

7. In a control linkage, a tubular support column having an aperture therein, a control member mounted within said support column for rotary and reciprocal movement about the longitudinal axis of said control member, means to rotate and reciprocate said control member, a pair of bearing rings, bearing means mounting said bearing rings for rotary movement and axially locating said bearing rings on said support column over said aperture to completely close said aperture, a controlled member connected to the external surface of each of said bearing rings, clutch means having parts extending from the internal surface of each of said bearing rings and a part connected to said control member cooperating through said aperture to selectively clutch said control member to said bearing rings.

8. In a control linkage, a tubular support column having a cylindrical portion with an aperture therein, a control member mounted within said support column for rotary and reciprocal movement about the longitudinal axis of said control member, means to rotate and reciprocate said control member, a pair of bearing rings mounted for rotary movement on said cylindrical portion, bearing means axially locating said bearing rings on said cylindrical portion of said support column over said aperture to completely close said aperture, a controlled member connected to each of said bearing rings, clutch means having parts internally of each of said bearing rings and parts connected to said control member cooperating through said aperture to selectively clutch said control member to said bearing rings.

9. In a control linkage, a tubular support column having an aperture therein, a control member mounted within said tubular support column for rotary and reciprocal movement about the longitudinal axis of said control member, means operatively connected to said control member to rotate and reciprocate said control member, a pair of controlled members each having bearing portions, bearing means rotatably mounting and axially locating said bearing portion of each controlled member on said support column and sealing said bearing portions to said support column on both sides of said aperture and said bearing portions to each other to completely seal said aperture, and clutch means on said control member and controlled members cooperating through said aperture to selectively engage each controlled member in response to axial movement and to rotate the selected controlled member on rotary movement.

10. In a control linkage; a tubular support column having a cylindrical portion with an aperture therein; a control member mounted within said tubular support column for rotary and reciprocal movement about the longitudinal axis of said control member; means mounted on said support column and operatively connected to said control member to rotate and reciprocate said control member; a pair of control levers each having a cylindrical bearing portion in bearing contact with said cylindrical portion of said tubular support column, a controlled portion extending away from said cylindrical bearing portion, and clutch teeth accessible from within said tubular column; means sealing the space between said bearing portion of each lever, thrust bearing means axially locating said bearing portions on said support column and clutch means fixed to said control member and bearing portions selectively engaging said control member to each lever in response to axial movement and to rotate the selected lever on rotary movement.

11. In a control linkage; a tubular support column having an aperture therein; a control member concentrically mounted within said tubular support column for rotary and reciprocal movement about the longitudinal axis of said control member; means mounted on said support column and operatively connected to said control member to rotate and reciprocate said control member; a pair of spaced bearing rings located outside and supported on said tubular support column on opposite sides of said aperture and each having an annular thrust bearing surface; said annular thrust bearing surfaces facing each other; a pair of control levers each having a cylindrical bearing portion in bearing contact with said tubular support column between said bearing rings, inner and outer annular bearing portions on each side, a lever portion extending away from said cylindrical bearing portion, and facing clutch teeth located internally of said tubular column and extending through said aperture into said column; the facing inner annular bearing portion of each lever being in thrust engagement with each other and the outer bearing portions contacting said annular thrust bearing surfaces on said bearing rings; and a clutch member fixed to said control member selectively engaging said clutch teeth on each lever in response to axial movement and to rotate the selected lever on rotary movement.

12. In a control linkage; a tubular support column having an aperture therein; a control tube concentrically mounted within said tubular support column for rotary and reciprocal movement about the longitudinal axis of said control tube; a hand lever mounted on said support column and operatively connected to said control tube to rotate and reciprocate said control tube; a pair of spaced bearing rings located outside and supported on said tubular support column on opposite sides of said aperture and each having an annular thrust bearing surface, said annular thrust bearing surfaces facing each other; a pair of control levers each having a cylindrical bearing portion in bearing contact with said tubular support column between said bearing rings, inner and outer annular bearing portions on each side, a lever portion extending away from said cylindrical bearing portion, and facing clutch teeth located internally of said tubular column and extending through said aperture into said column; the facing inner annular bearing portion of each lever in thrust engagement with each other and the outer bearing portions contacting said annular thrust bearing surfaces on said bearing rings; and a clutch member fixed to said control tube selectively engaging said clutch teeth on each lever in response to axial movement and to rotate the selected lever on rotary movement.

13. In a control linkage, a tubular support column having an aperture therein, a control member mounted within said support column for rotary and reciprocal movement about the longitudinal axis of said control member, means to rotate and reciprocate said control member, a pair of controlled members each having a bearing portion, a closure portion, a clutch portion and an actuator portion, bearing means mounting said bearing portion of said controlled members for rotary movement and axially locating said controlled members on said support column with said closure portion closing said aperture to completely close and seal said aperture, clutch means on said control member cooperating with said clutch portion to selectively clutch said control member to said controlled members, said actuating portion being located externally of said tubular support column and said control members extending through said aperture.

References Cited in the file of this patent
UNITED STATES PATENTS

| | | |
|---|---|---|
| 1,425,227 | Woodward | Aug. 8, 1922 |
| 2,631,467 | Lincoln et al. | Mar. 17, 1953 |